US012144417B2

(12) United States Patent
Madison et al.

(10) Patent No.: US 12,144,417 B2
(45) Date of Patent: Nov. 19, 2024

(54) FURNITURE WITH ACOUSTICAL TREATMENTS

(71) Applicant: RPG ACOUSTICAL SYSTEMS LLC, Passaic, NJ (US)

(72) Inventors: Jeffrey S Madison, Wallingford, PA (US); Peter D'Antonio, Bowie, MD (US)

(73) Assignee: RPG ACOUSTICAL SYSTEMS LLC

( * ) Notice: Subject to any disclaimer, the term of this patent is extended or adjusted under 35 U.S.C. 154(b) by 213 days.

(21) Appl. No.: 17/557,188

(22) Filed: Dec. 21, 2021

(65) Prior Publication Data

US 2023/0189983 A1 Jun. 22, 2023

(51) Int. Cl.
*A47B 13/02* (2006.01)
*A47B 96/20* (2006.01)
*G10K 11/168* (2006.01)

(52) U.S. Cl.
CPC .............. *A47B 13/02* (2013.01); *A47B 96/20* (2013.01); *G10K 11/168* (2013.01); *A47B 2220/13* (2013.01)

(58) Field of Classification Search
CPC ..... A47B 13/02; A47B 96/20; A47B 2220/13; G10K 11/168
USPC .......................................... 181/292; 312/204
See application file for complete search history.

(56) References Cited

U.S. PATENT DOCUMENTS 1,716,207 A * 6/1929 Canto .................... A47B 47/00 312/7.1
2,162,333 A * 6/1939 Golden ................ A47B 96/205 52/783.17
2,350,513 A * 6/1944 Leadbetter ................ E04B 1/86 52/794.1
2,363,068 A * 11/1944 Leadbetter ................ E06B 5/20 52/404.3
2,397,609 A * 4/1946 Leadbetter ................ E04H 1/14 52/145

(Continued)

FOREIGN PATENT DOCUMENTS

DE 10214778 2/2003
DE 202010017487 U1 2/2012

(Continued)

OTHER PUBLICATIONS

WIPO Machine Translation of WO 2006/056351 (Year: 2005).*

*Primary Examiner* — Daniel J Troy
*Assistant Examiner* — Timothy M Ayres
(74) *Attorney, Agent, or Firm* — H. Jay Spiegel

(57) ABSTRACT

Furniture such as desks and other items are provided with sound absorbing features consisting of micro-perforations extending through structures having vertical surfaces. The micro-perforations are formed using a LASER cutting tool or a punch and are either cylindrical or frustoconical. The micro-perforations are formed in drawer facings, doors, support structures, and free-standing objects and storage devices having vertical surfaces. The micro-perforations have diameters in the range of 0.20 to 0.70 mm. The micro-perforations have been found to increase sound absorption of a desk by as much as 4 Sabins within the frequency range of 100 to 5,000 Hz. Structural panels consisting of front and rear micro-perforated panels surrounding a porous central core may be employed in such furniture.

25 Claims, 19 Drawing Sheets

(56) References Cited

U.S. PATENT DOCUMENTS 2,673,132 A * 3/1954 Alderman ............. E04B 1/8218 312/107
3,649,430 A * 3/1972 Lewis ................... E04B 1/8409 428/596
3,770,560 A * 11/1973 Elder ...................... B32B 27/00 428/116
4,701,066 A 10/1987 Beam et al.
5,424,497 A 6/1995 Dias et al.
5,741,456 A * 4/1998 Ayrton ................... B23K 26/40 428/113
6,272,795 B1 8/2001 Brauning
8,499,887 B2 * 8/2013 Gleine .................... B32B 5/024 181/292
8,720,642 B1 * 5/2014 Beckervordersandforth ............... G10K 11/172 181/290
9,369,805 B2 6/2016 Wilson
9,521,911 B2 * 12/2016 Hebenthal .............. A47D 11/00
10,988,924 B2 * 4/2021 Hakuta ..................... B32B 7/14
11,254,087 B2 * 2/2022 Null ........................ B32B 3/266
11,257,475 B2 * 2/2022 Von Fange .............. B32B 27/32
2002/0117351 A1 * 8/2002 Chen ......................... E04B 1/86 181/290
2009/0159363 A1 * 6/2009 Weber .................... A47B 83/04 181/290
2009/0250293 A1 * 10/2009 Gleine .................... B32B 5/024 181/290
2009/0277715 A1 * 11/2009 Scharer .................. A47B 47/00 181/286
2012/0132629 A1 * 5/2012 O'Brien ............... B23K 26/082 219/121.72
2012/0213961 A1 * 8/2012 Graham ............... A47B 96/205 428/131
2016/0088941 A1 * 3/2016 Snowbarger ............ B32B 15/08 156/306.6
2016/0316907 A1 * 11/2016 Lee ......................... F16B 12/10
2018/0347264 A1 * 12/2018 Wang ...................... E06B 3/822
2019/0392809 A1 * 12/2019 Von Fange ........... G10K 11/168
2020/0219475 A1 * 7/2020 Hakuta ..................... B32B 5/26
2020/0262742 A1 * 8/2020 Jaramillo ................ C03C 15/00
2021/0100359 A1 * 4/2021 Bowers .................. A47B 53/02
2022/0093072 A1 * 3/2022 Ayres ................... G10K 11/172

FOREIGN PATENT DOCUMENTS

EP 2039841 3/2009
WO WO-2006056351 A1 * 6/2006 ........... G10K 11/172

* cited by examiner

FURNITURE WITH ACOUSTICAL TREATMENTS

BACKGROUND OF THE INVENTION

The present invention relates to furniture with acoustical treatments incorporated therein. Surfaces bearing micro-perforations are known as providing sound attenuation in the range of 100 Hz to 2000 Hz. As such, patterns of micro-perforations on a structure are used as sound absorbing features.

The acoustics of a commercial or residential working environment, meeting room, conference room or office are directly related to the comfort and ability of persons in those areas to communicate in person, remotely or virtually. A typical residential or office space includes vertical walls that comprise hard surfaces that reflect soundwaves and, in some cases, amplify them. Furniture including desks, filing cabinets, and other structures typically have flat, hard walls that also reflect soundwaves. In such environments, it may be difficult for people in those spaces to not only hear the spoken word but to communicate with each other. Incorporating sound attenuating features into the typical objects within a room area would enhance the ability of its occupants to clearly hear the spoken word and to communicate. It would also be advantageous if sound attenuating features could be incorporated into objects typically found in such spaces without in any way significantly affecting the aesthetic design of such objects. It is with these goals in mind that the present invention was developed.

The following prior art is known to Applicants.

U.S. Pat. No. 4,701,066 to Beam et al. discloses a decorative sound absorbing panel for furniture. In this device, sound absorbing panels are assembled around furniture. The present invention distinguishes from this invention as incorporating sound absorbing features into the furniture itself.

U.S. Pat. No. 5,424,497 to Dias et al. discloses a sound absorbing wall panel which incorporates fibrous sound absorbing material as well as a honeycomb structure in order to absorb sound. The present invention differs from the teachings of this invention as contemplating sound absorbing furniture with the sound absorbing features incorporated into the furniture itself.

U.S. Pat. No. 6,272,795 to Brauning discloses movable office furniture which may include shelf partitions that are produced from a sound absorbing material. This patent does not disclose the use of micro-perforations.

U.S. Pat. No. 9,369,805 to Wilson discloses an acoustic absorber which comprises an absorption layer composed of an open-pored porous material which is flexurally stiff and absorbs soundwaves. This patent fails to teach or suggest incorporating micro-perforated structures into furniture for sound attenuation purposes.

U.S. Pat. No. 9,521,911 to Hebenthal discloses a furniture system for adjusting sound levels in children's rooms which includes sound absorbing structure. However, this patent fails to teach or suggest the use of micro-perforations for sound attenuating purposes.

Published Application No. US 2009/0277715 A1 to Scharer et al. discloses a furniture system for influencing the acoustics of a room. This published application discloses perforations having a diameter of about 5 mm. These are not micro-perforations which typically have a diameter ranging from 0.25 mm to 0.65 mm. Accordingly, Scharer et al. fail to teach or suggest the present invention.

German Publication DE10214778 A1 discloses a sound absorbing panel that includes micro-perforations with a diameter of "less than 2 mm, preferably 1 mm." The present invention differs from the teachings of this publication as contemplating micro-perforations having a diameter in the range of 0.25 mm to 0.65 mm.

Published European Patent Application EP2039841 A1 discloses furniture incorporating sound absorption principles that include a perforated plate. There is no teaching or suggestion in this publication of the use of micro-perforated structures incorporated into furniture without changing the aesthetics of the furniture.

German Publication DE202010017487U1 discloses the general concept of a perforated structure.

SUMMARY OF THE INVENTION

The present invention relates to furniture with acoustical treatments. In the present invention, acoustical furniture systems have incorporated therein micro-perforated, preferably vertical, elements which are incorporated into, for example, cabinet doors, drawer facades, and other vertical non-operable structural surfaces. While it is preferred that the micro-perforations be provided in strictly vertical surfaces, surfaces that are angled and have a vertical component may also have such treatments.

As is known to those skilled in the art, micro-perforations used as sound attenuating structures typically have diameters ranging from 0.20 to 0.70 mm, preferably 0.25 mm to 0.65 mm. Micro-perforations at this dimension range are relatively invisible at a normal viewing distance of several feet and thus do not detract from the aesthetic appeal of the furniture in which they are incorporated.

While micro-perforations are known as a sound attenuating feature, they have never been used incorporated into furniture. Applicants have designed furniture in which such micro-perforations are incorporated and have found that such structures effectively attenuate soundwaves particularly within the range of the spoken word such as 100 to 2,000 Hz.

Helmholtz absorbers typically include perforations at least 1 mm in diameter and typically 4-12 mm in diameter. Such structures require an acoustical absorbing material behind the perforations in order to effectively absorb sound and prevent its reflection back into the space where the Helmholtz absorber is located. By contrast, the present invention contemplates use of micro-perforations on preferably vertical surfaces with the micro-perforations falling within the range of 0.20 to 0.70 mm. Micro-perforations of that size do not require any sound absorbent material to the rear. It is also known that such micro-perforations can be cylindrical or, if desired, they can be frustoconical with the smaller diameter being at the rear surface and the larger diameter at the front surface. Typically, micro-perforations are formed in a surface employing a laser drilling device which creates frustoconical micro-perforations. A laser drilling device creates a circular cross-section for micro-perforations. Punching may also be employed to form micro-perforations and any other device for creating micro-perforations may be employed.

Every hard surface has a boundary layer comprising a thin skin of air covering the surface. Micro-perforated panels are best described as Helmholtz resonators with extremely small holes. They provide sound absorption through high viscous losses as air passes through the holes that are only a bit larger than the boundary layer. This provides inherent damping that eliminates the need for any fiberglass or other porous sound absorbing materials in the air cavity between a perforated sheet and the reflective surface behind it.

In determining the effectiveness of the present invention, Applicants tested a piece of furniture first as normally manufactured with solid vertical surfaces, and then modified the piece of furniture to replace the solid vertical surfaces with micro-perforated surfaces. The results were dramatic. From the entire frequency range from 100 Hz to 5000 Hz, the furniture with the micro-perforations registered significantly higher in Sabins than was the case with the original furniture, as much as 4-5 Sabins higher, although this is exemplary. This indicates to Applicants that the present invention can effectively attenuate soundwaves within a room where furniture modified in accordance with the teachings of the present invention may be located.

Disclosed herein are numerous examples of furniture that may have enhanced sound absorption in accordance with the teachings of the present invention. Exemplary pieces of furniture disclosed herein include desks, cabinets, shelving systems, as well as free-standing objects that may suitably employ micro-perforations to attenuate sound. Also disclosed are structures employed in furniture in accordance with the teachings of the present invention, including panels having a front veneer with micro-perforations, a porous central core allowing soundwaves to freely convey therethrough, and a rear veneer with micro-perforations.

Accordingly, it is a first object of the present invention to provide furniture with acoustical treatments.

It is a further object of the present invention to provide such furniture in which the acoustical treatments consist of vertical surfaces modified by providing them with a pattern of micro-perforations.

It is a yet further object of the present invention to provide such furniture with micro-perforations having a diameter in the range of 0.20 mm to 0.70 mm.

It is a still further object of the present invention to provide such micro-perforations which are generally cylindrical in configuration.

It is a still further object of the present invention to provide such micro-perforations that are frustoconical with their larger diameter being closer to the front surface of the structure in which the micro-perforations are formed.

It is a yet further object of the present invention to provide such an invention in which the micro-perforations are small enough to be barely visible to the human eye.

It is a still further object of the present invention to provide furniture with such micro-perforations which reduce sound in a room where the furniture is located, registering significantly higher Sabins when sound attenuation is measured.

It is a yet further object of the present invention to provide acoustical furniture with broad bandwidth absorption extending down to 100 Hz to complement additional traditional absorbing surfaces like T-bar ceiling systems and fabric panels.

It is a still further object of the present invention to employ micro-perforated panels in the design of furniture including, as one example, integrated working desks consisting of a desktop, a side desk, upper, lower and side cabinets, and a vanity screen, said panels consisting of front and rear micro-perforated veneers and a central porous core.

It is a yet further object of the present invention to micro-perforate panels of storage cabinets, shelving, and free-standing furniture objects.

It is a still further object of the present invention to employ micro-perforated panels for other solid objects in a work office besides desk structures such as storage cabinets and others.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
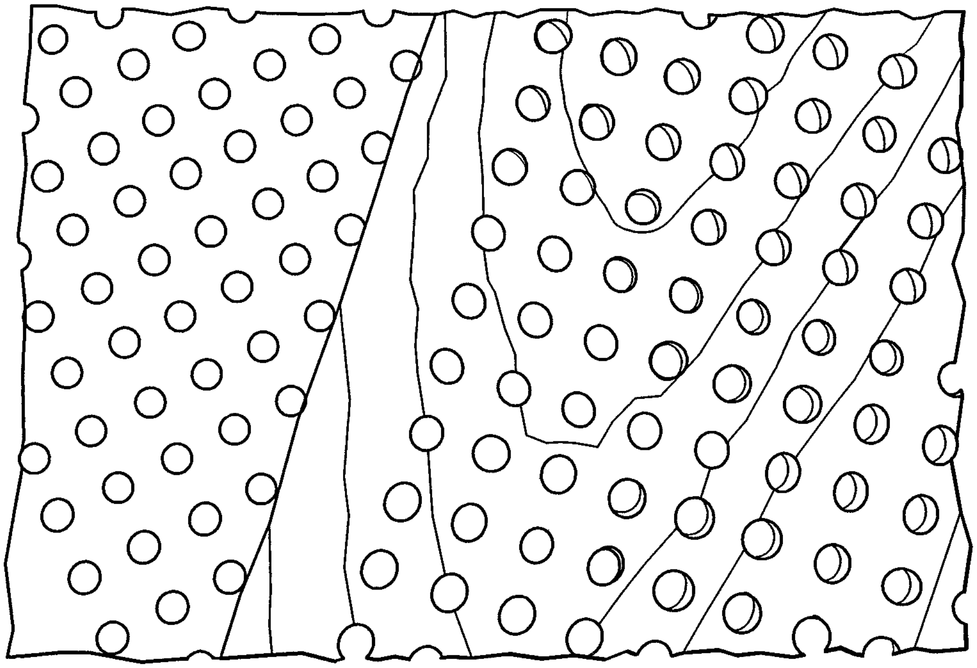
FIG. 1 PRIOR ART
FIG. 1 shows a traditional Helmholtz absorber with perforations having diameters greater than 1 mm.

Traditional approaches to absorb low and mid frequencies have relied on Helmholtz resonators, as shown in FIG. 1. While effective, this approach utilizes relatively large perforations with diameters between 4-12 mm, which visually impact the surfaces treated, and also require porous material in the rear cavity. Microperforated panel (MPP) devices, described by Ma in the 1960s, are Helmholtz resonators with very small holes. They provide absorption through high viscous losses as air passes through the holes that are only a bit larger than the boundary layer which is a thin skin of air covering every surface. This inherent damping eliminates the need for fiberglass or other porous materials in the air cavity between the perforated sheet and any reflective surface behind it although such materials do enhance sound attenuation. From a technical standpoint, consider a simple absorber formed by a cavity with a covering sheet. The covering sheet could either be perforated to form a Helmholtz design or be solid but flexible to form a membrane absorber. The impedance is given below, including the mass term given in Equation 1 (jωm), the resistance ($r_m$) and the impedance of the cavity as the last term. These are the acoustic mass and resistance, respectively, due to the perforated sheet or membrane. The surface impedance of the resonant system is given by $$z_{s1}=r_m+j[\omega m-\rho c\cot(kd)], \qquad (1)$$

where k=2π/λ is the wavenumber in air, d is the cavity depth; in is the acoustic mass per unit area of the panel, ω is the angular frequency, ρ is the density of air, and c is the speed of sound in air.

A full expression for the mass is given by $$m=\frac{\rho}{\varepsilon}\left[t+2\delta a+\sqrt{\frac{8v}{\omega}\left(1+\frac{t}{2a}\right)}\right]. \qquad (2)$$

Figure 5:
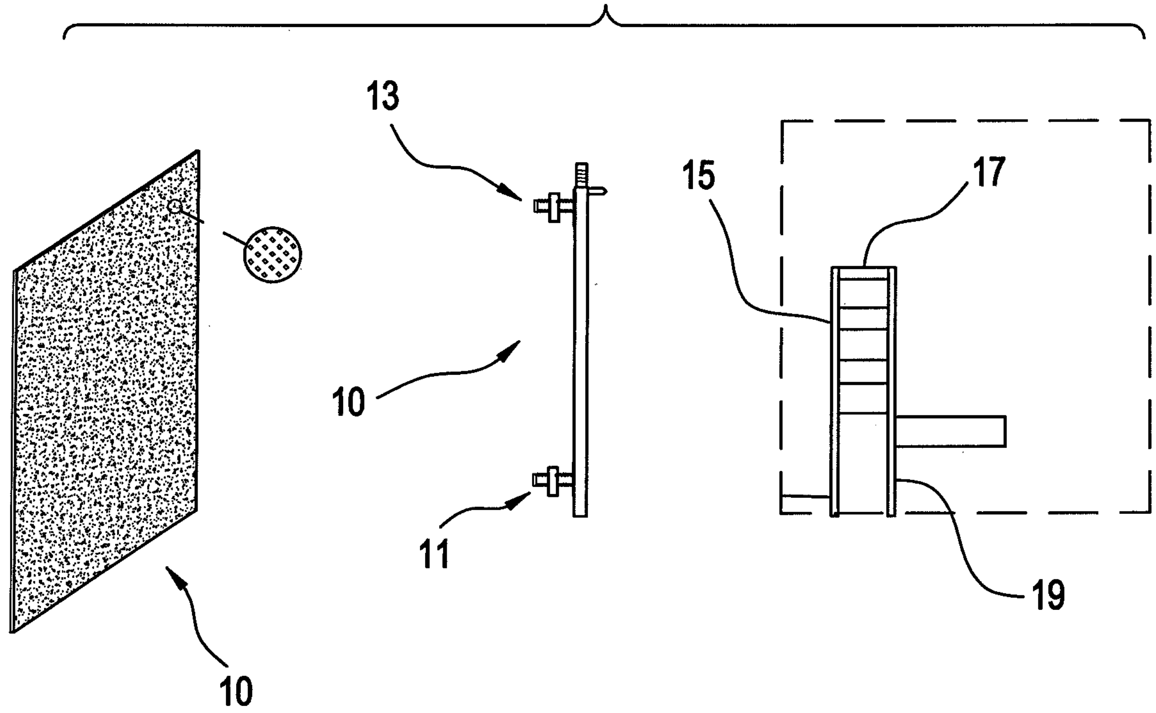
FIG. 5 shows front, side, and cross-sectional views of a cabinet door made in accordance with the teachings of the present invention.
Figure 6:
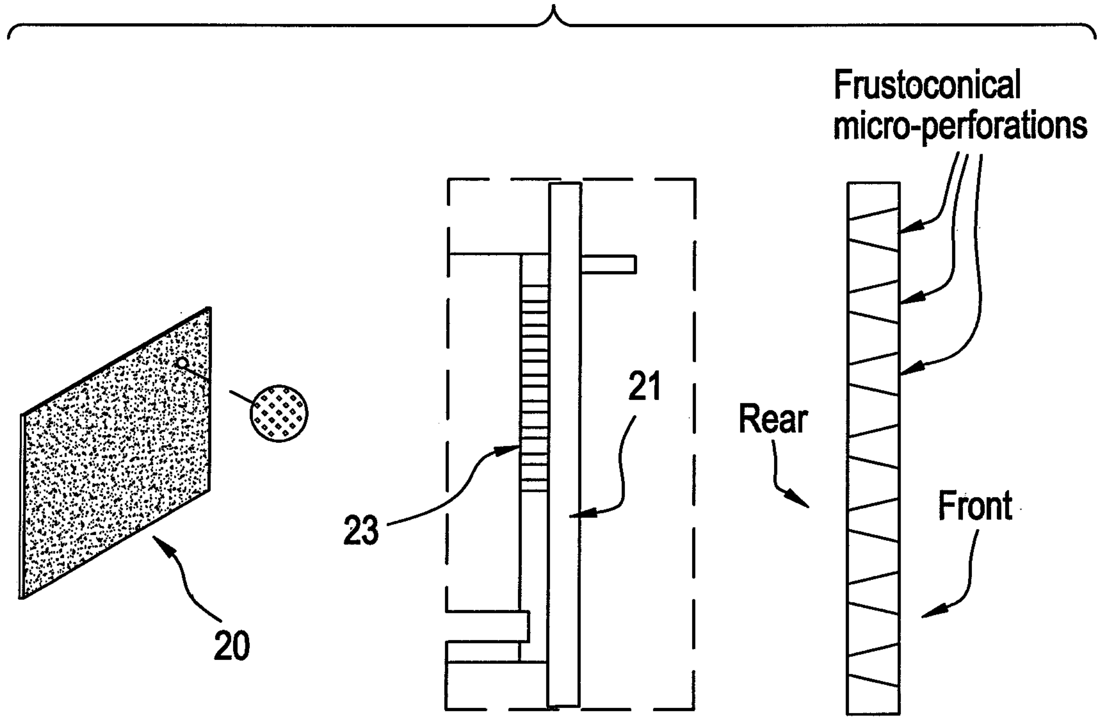
FIG. 6 shows front and cross-sectional views of a drawer front made in accordance with the teachings of the present invention.

The last term in the equation is due to the boundary layer effect, and ν=15×10−6 m2s−1 is the kinemetric viscosity of air. This last term is often not significant unless the hole size is small, say, submillimeter in diameter. δ is the end correction factor, which, to a first approximation, is usually taken as 0.85 and derived by considering the radiation impedance of a baffled piston. Hence, using micro-perforations between 0.20 and 0.70 mm, we do not require porous absorption in the cavity and the perforations are not visible at normal viewing distances. In FIGS. 5 and 6, Applicants illustrate a schematic view of the layers comprising the micro-perforated panel.

With reference to FIG. 5 a cabinet door is designated by the reference numeral 10 and in the example shown is rectangular. A side view in FIG. 5 of the cabinet door 10 shows the hinges 11 and 13. With regard to the detail portion of the figure, reference is also made to FIG. 4 for a better understanding that the facing 15 is micro-perforated, the core 17 has perforations greater than 1 mm in diameter and the back face 19 is also micro-perforated. FIG. 6 shows a drawer front 20 and the detail shows the front portion 21 as well as a core 23 similar to the core 17 shown in FIG. 4. If desired, a micro-perforated back face (not shown) may be provided. The right hand image in FIG. 6 shows a veneer with frustoconical micro-perforations formed by a laser drilling device.

Figure 3:
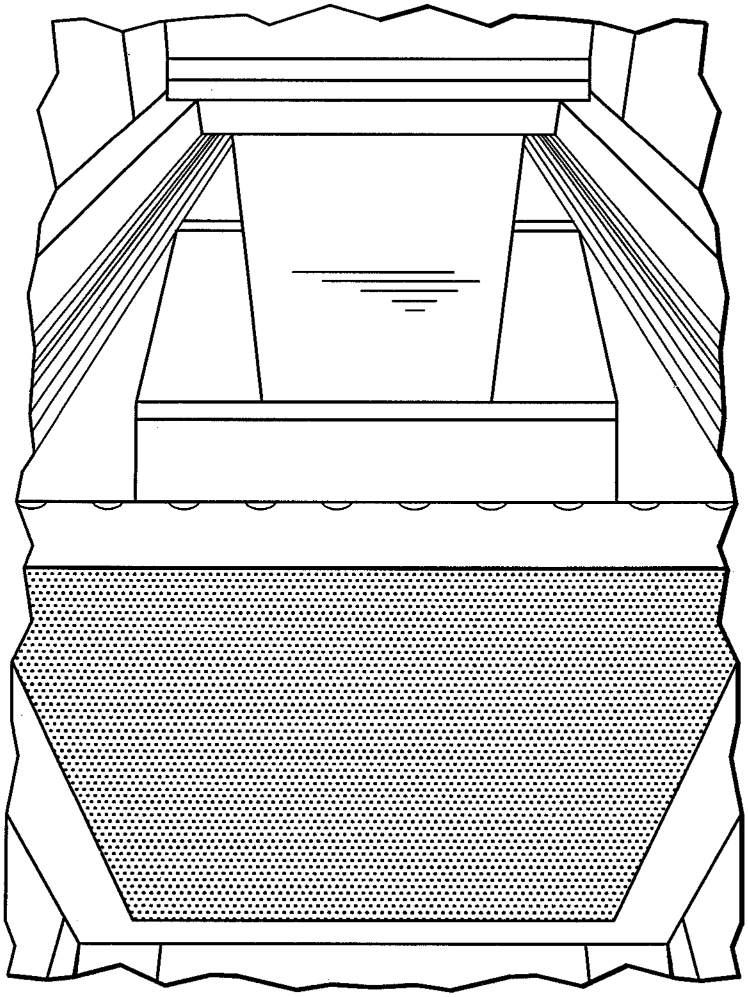
FIG. 3 shows an acoustical furniture façade in an impedance tube used to test acoustical characteristics.
Figure 4:
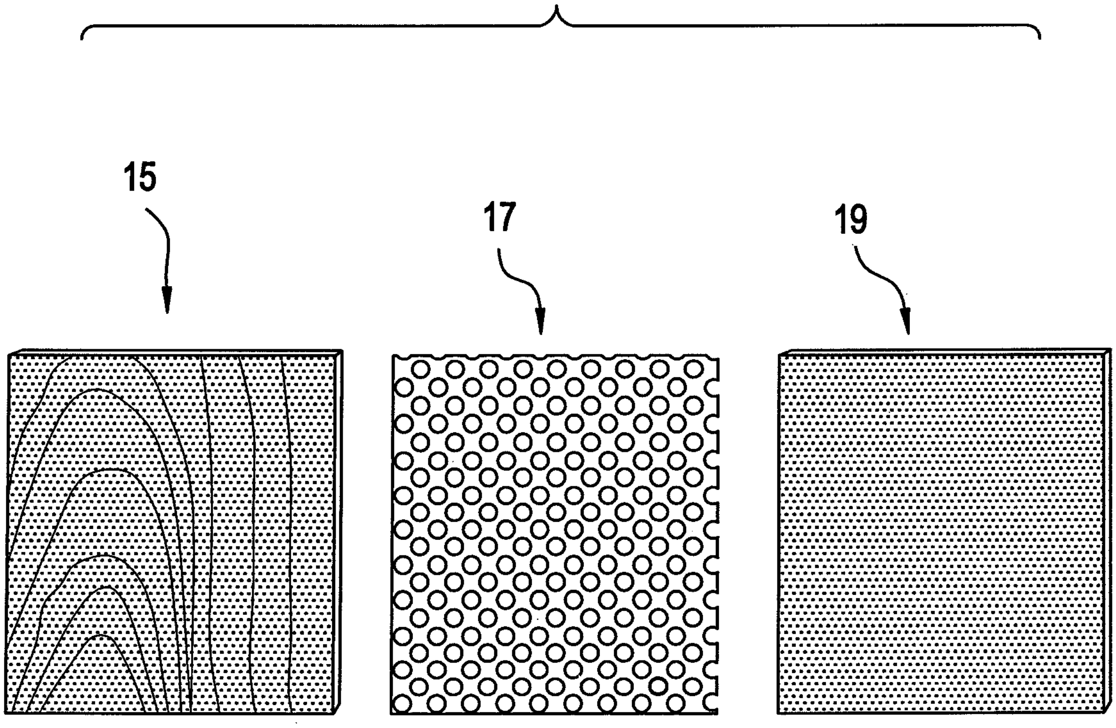
FIG. 4 shows three layers of structures in accordance with the teachings of the present invention incorporated into furniture.

FIG. 4 shows an image of the micro-perforated face, the perforated core, and the micro-perforated rear face forming the inventive structure. In FIG. 3, the micro-perforated facade is shown in an impedance tube with an empty rear cavity of 12 inches, to mimic the depth of a typical cabinet for testing purposes.

Figure 9:
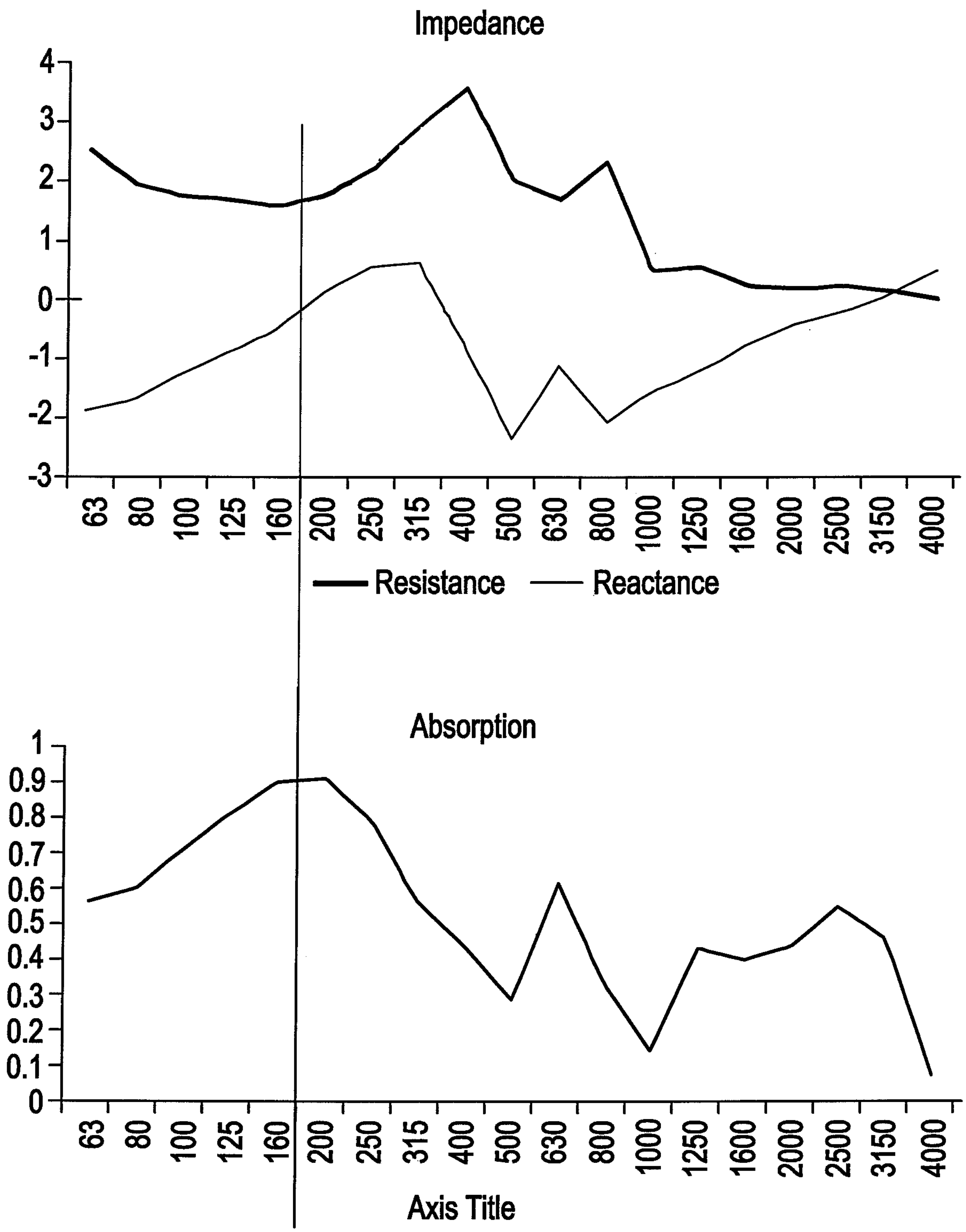
FIG. 9 shows graphs of impedance and absorption versus frequency in Hz.

The complex impedance (top) and normal incidence absorption measured in an impedance tube with a cavity depth of 12 inches are shown in FIG. 9. The vertical line at 200 Hz marks the frequency at which the Reactance crosses zero, resulting in a maximum in the absorption coefficient, for this configuration. The impedance tube is typically used as an engineering guide, since a relatively small sample size can be used, and the complex impedance can be studied. Evaluation of the normalized Resistance informs whether the sample offers too little or too much resistance to air. When it is ideally equal to 1, the absorption is at a maximum. In FIG. 9, the Resistance is roughly 0.7 and hence the absorption is 0.9.

Figure 10:
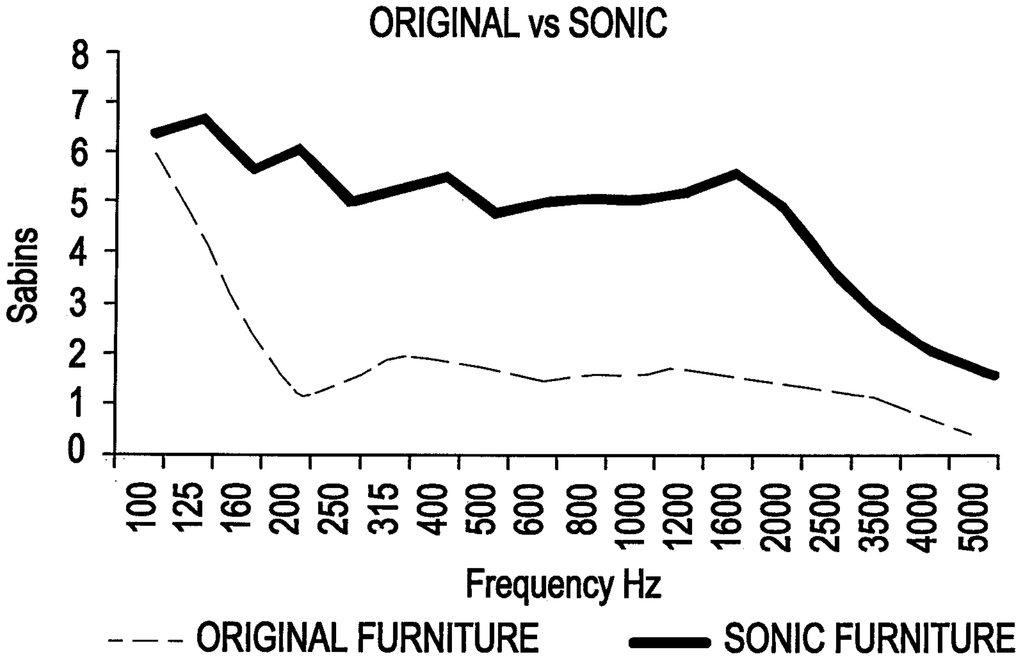
FIG. 10 shows a graph of the level of Sabins versus frequency comparing prior art furniture with furniture manufactured in accordance with the teachings of the present invention.
Figure 11:
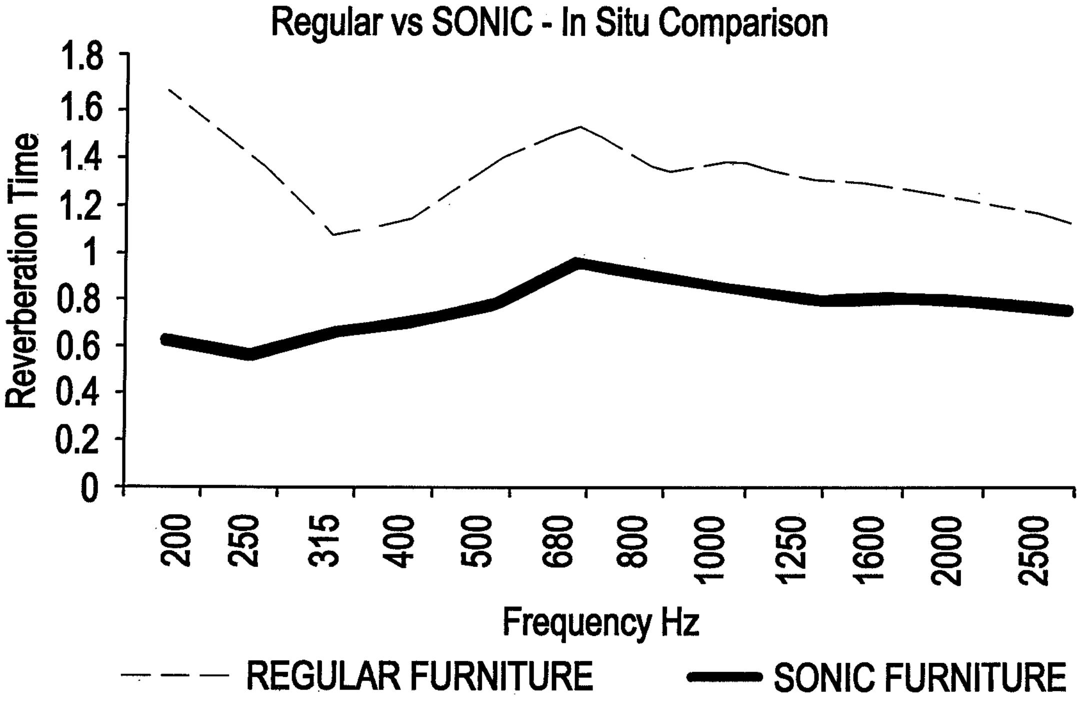
FIG. 11 shows a graph of reverberation time versus frequency in Hz comparing prior art furniture with furniture in accordance with the teachings of the present invention.

Once the micro-perforated panel is designed and tested in an impedance tube such as shown in FIG. 3, a complete system can be measured in a reverberation chamber, using a sample size of, for example, 120 sq. ft. A comparison of the random incidence absorption coefficient for the non-acoustical and the micro-perforated version (the present invention) are shown in FIG. 10. The data clearly show the broad bandwidth of the acoustical furniture. When a planar sample of known surface area is measured, the Equivalent Absorption Area can be divided by the surface area to yield the traditional absorption coefficient. In this case, the effective absorption is shown as the Equivalent Absorption Area (sometimes called Sabins). The higher the Sabins number, the greater the sound absorption. FIG. 10 shows the superior performance of the furniture illustrated in FIG. 7 as compared to that of FIG. 2. In particular, FIG. 10 shows that the FIG. 7 furniture increased sound absorption compared to that of the FIG. 2 furniture by up to 4-5 Sabins in the frequency range of 100 Hz to 5,000 Hz. The indication of sound absorption up to 4-5 Sabins is merely exemplary. It is possible to achieve sound absorption to greater levels. FIG. 11 is a graph of reverberation time versus frequency and shows a reduction in reverberation time resulting from addition of micro-perforations in the subject furniture.

FIG. 1 shows a prior art traditional Helmholtz absorber panel which incorporates perforations having a diameter greater than 1 mm. Such a panel requires the rear thereof to face an absorbing material such as fiberglass or other material. This is required where large perforations are employed because the perforations themselves only allow sound waves to gain access to the rear portion. This is to be contrasted with micro-perforations in the range of 0.20 to 0.70 mm in which the perforations themselves provide sound attenuation and there is no need to provide a sound absorbing material to the rear.

Figure 2:
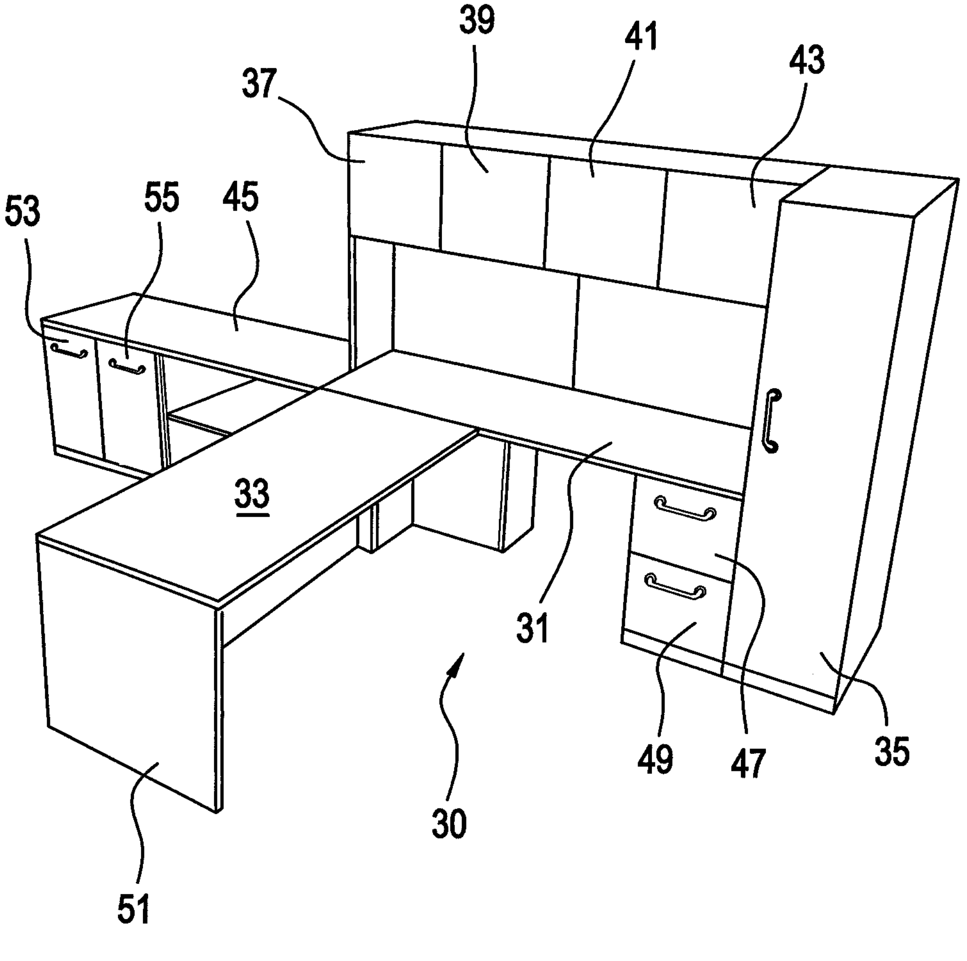
FIG. 2 PRIOR ART
FIG. 2 shows an example of a prior art office furniture integrated desk assembly.

FIG. 2 shows a prior art desk assembly generally designated by the reference numeral 30 and having structures with vertical and horizontal surfaces, including a horizontal desk structure 31 and 33, a vertical cabinet door 35, additional vertical cabinet doors 37, 39, 41 and 43, an additional horizontal surface 45, additional drawers 47 and 49, a vertical support structure 51 having a vertical surface, and a storage area closed by doors 53 and 55. Cabinet doors and drawer fronts are optional.

Figure 7:
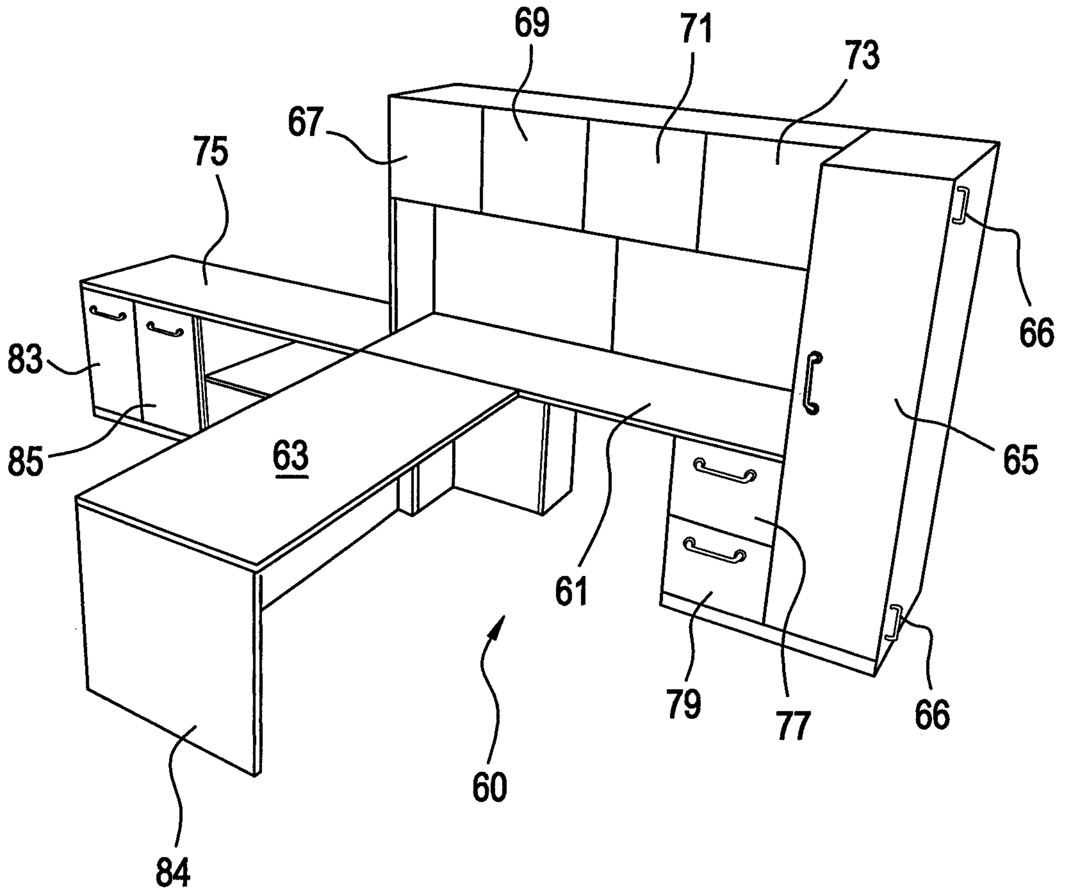
FIG. 7 shows an integrated desk assembly similar to that which is shown in FIG. 2 but with vertical surfaces from the assembly of FIG. 2 replaced with micro-perforated structures in accordance with the teachings of the present invention.

With reference to FIG. 7, the desk assembly 30 of FIG. 2 is modified into the desk assembly 60 having structures with vertical and horizontal surfaces in which the doors and drawers with front vertical surfaces from FIG. 2 are replaced by doors and drawers with front vertical surfaces 65, 67, 69, 71, 73, 77, 79, 81 (a wide vertical support leg), 83 and 85 with micro-perforated structures such as shown in FIGS. 4, 5 and 6, including a micro-perforated front face, a core with larger perforations and, if desired, a back micro-perforated face. The horizontal flat surfaces 61, 63 and 75 are unchanged from the respective structures 31, 33 and 45 from FIG. 2. The door 65, for example, pivots about vertical hinges 66. The doors and drawers are optional but, where included, can be micro-perforated to enhance sound attenuation.

Figure 8:
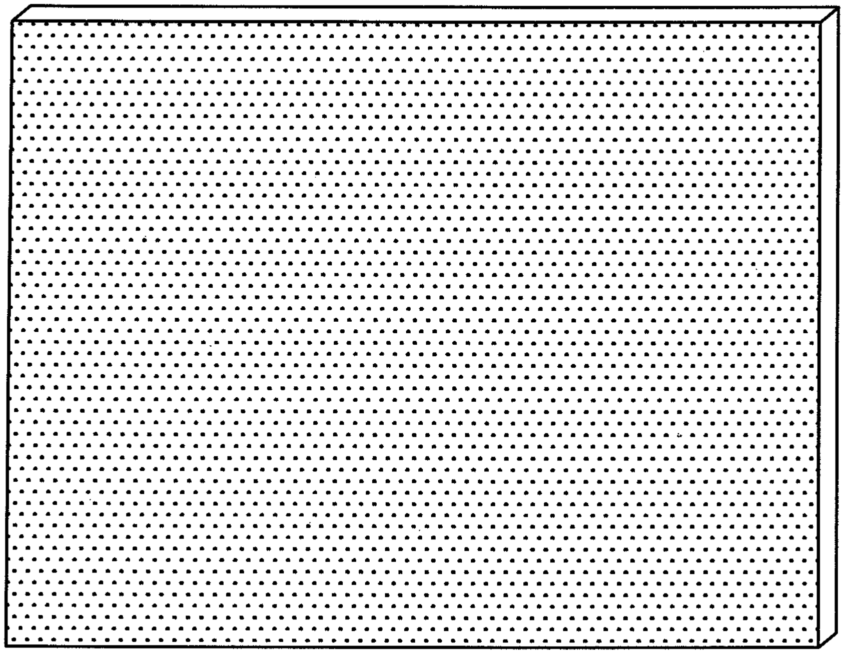
FIG. 8 shows a detailed view of a micro-perforated absorber in which the perforations have diameters in the range of 0.25 to 0.65 mm.

FIG. 8 shows a preferred pattern of micro-perforations on a surface. The perforations have a diameter of between 0.20 mm and 0.70 mm. While one pattern of micro-perforations is shown, any desired pattern of perforations is conceivable. Since the micro-perforations are so small, they are barely visible to the naked eye. As such, more aesthetically pleasing patterns of micro-perforations are not necessary.

Figure 12:
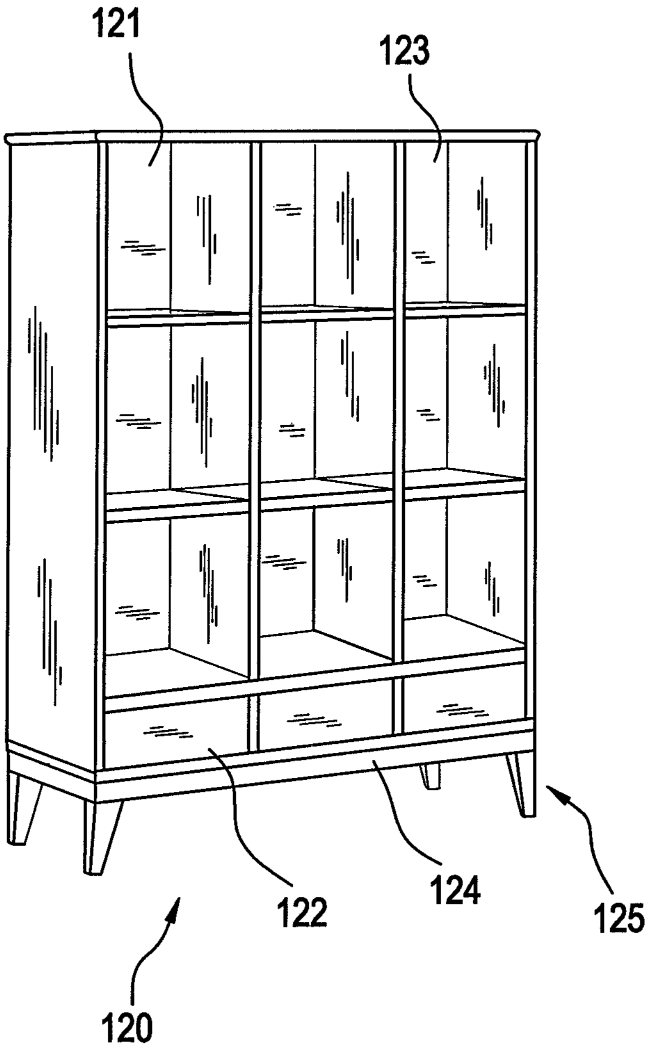
FIG. 12 shows a storage device including storage cubicles as well as drawers.

FIG. 12 shows a storage device 120 that includes a plurality of storage cubicles 121 defined by rectangular walls as well as a plurality of drawers 122. The cubicles have rear surfaces 123 that may be provided with a pattern of micro-perforations. Similarly, the faces of the drawers 122 may be provided with micro-perforations along with the face 124 of the stand 125.

Figure 13:
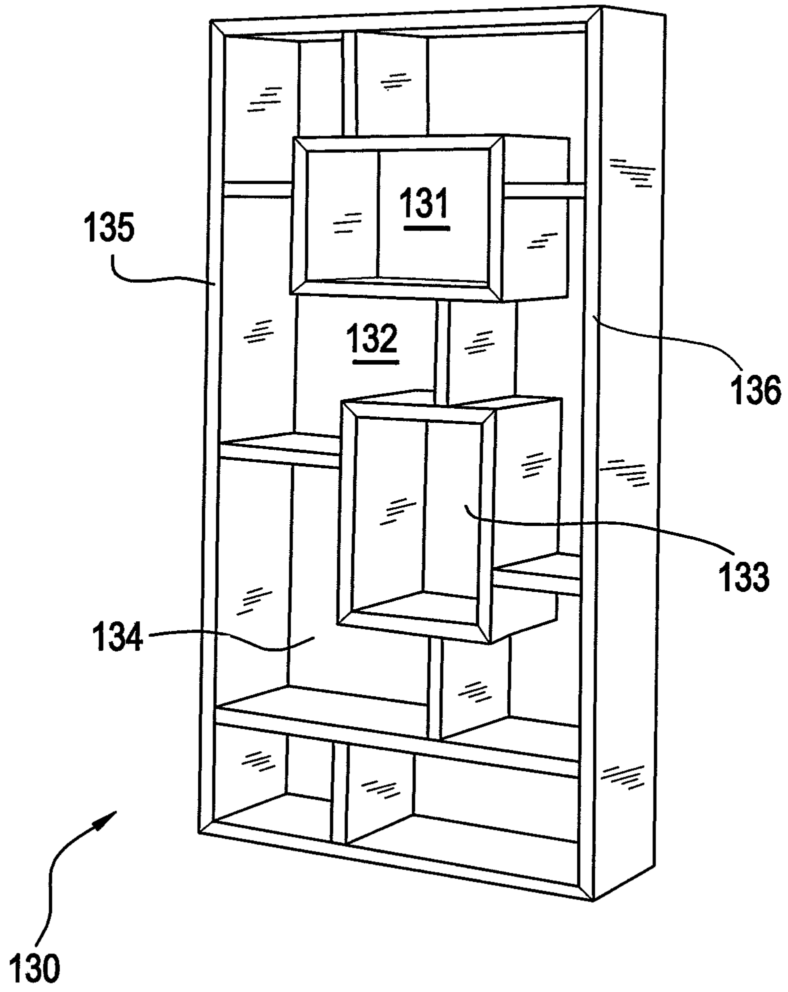
FIG. 13 shows a free-standing storage device having a plurality of openings providing volumes where objects can be stored and displayed.

FIG. 13 shows a free-standing storage device 130 having a plurality of openings, for example, 131, 132, 133, 134, etc. This storage device is open to the rear. The side edges such as those designated by the reference numerals 135 and 136 may be provided with a pattern of micro-perforations.

Figure 14:
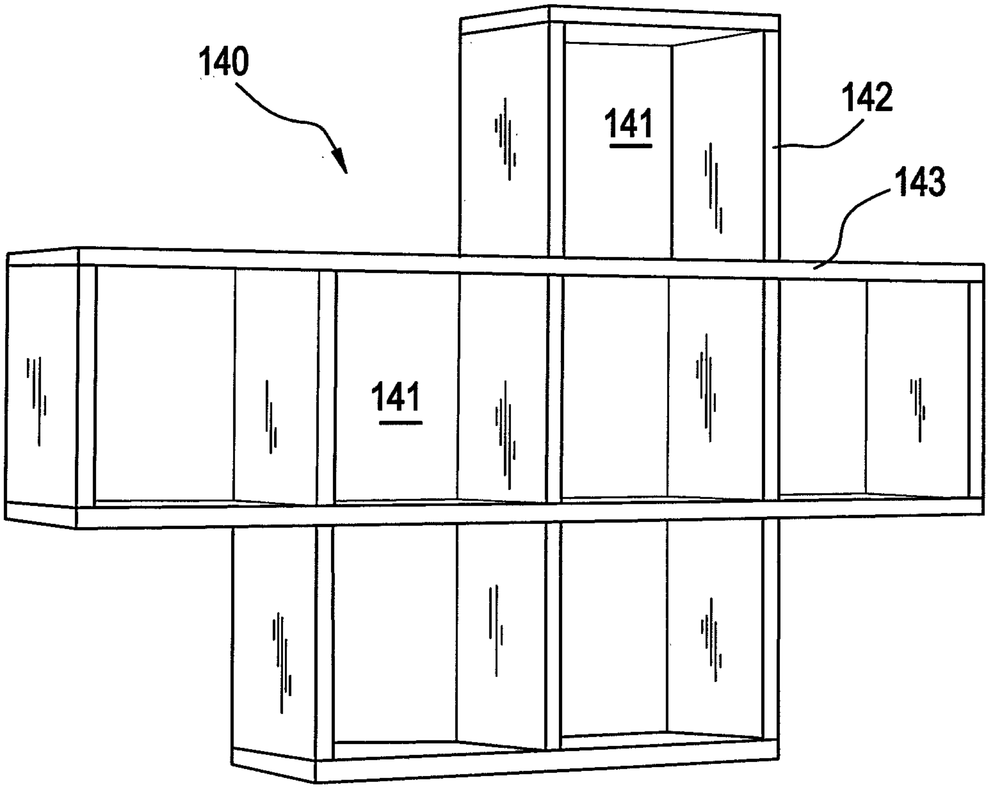
FIG. 14 shows a wall-mounted storage device having a plurality of openings providing volumes where objects can be stored and displayed.

FIG. 14 shows a wall-mounted storage device 140 with a plurality of openings 141 formed by wall structures, for example, 142, 143, etc. The forward facing edges of the wall structures may be provided with micro-perforations.

Figure 15:
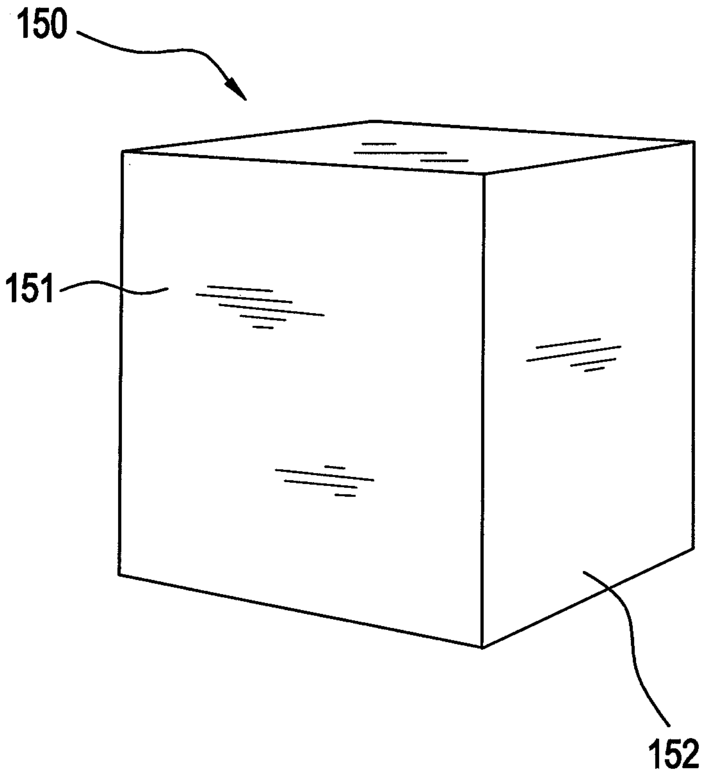
FIG. 15 shows a free-standing rectangular cubic object including vertical surfaces that may be improved with micro-perforations.

FIG. 15 shows a free-standing rectangular cubic object that may be placed within a room area and may be used as a seat or as a support for another object such as, for example, a planter (not shown). The object 150 shows vertical side surfaces, for example, 151 and 152, that may be provided with patterns of micro-perforations to help attenuate sound in the room where the object 150 is located.

Figure 16:
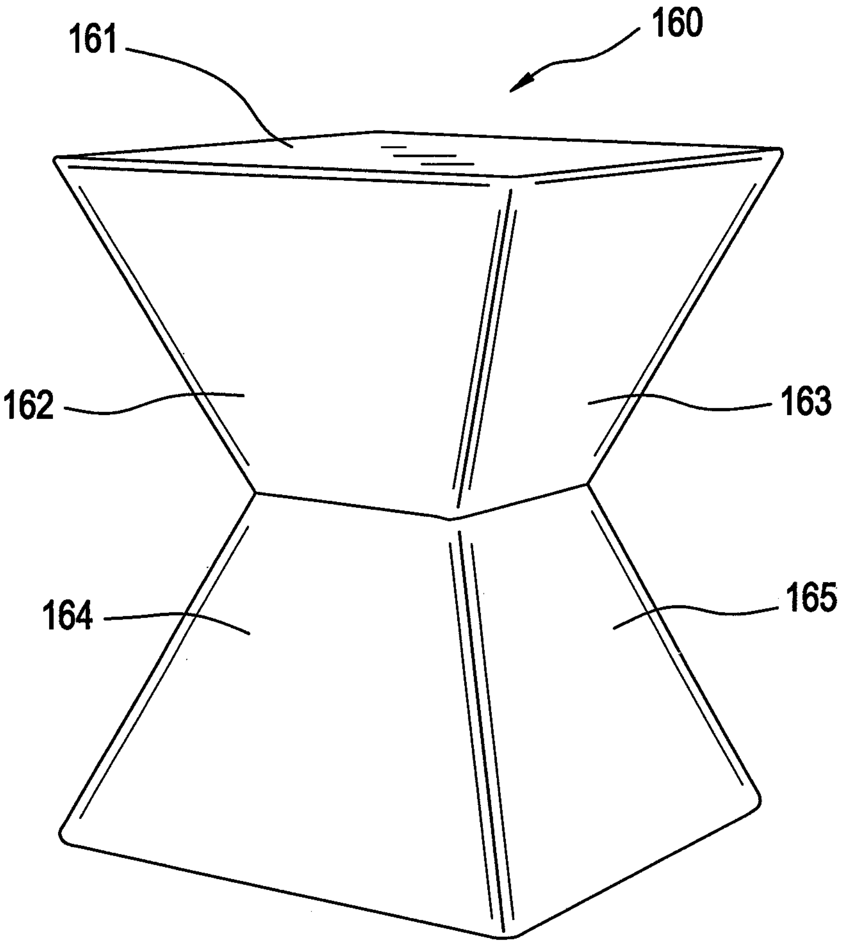
FIG. 16 shows a free-standing object having angled surfaces that may be improved with micro-perforations.

FIG. 16 shows another free-standing object 160 that may be used as a seat or as a support for another object, for example, a planter (not shown), and that includes a top surface 161 and side surfaces, for example, 162, 163, 164 and 165. These side surfaces are angled but they are not horizontal. Rather, they have both horizontal and vertical components. As such, the side surfaces may be provided with patterns of micro-perforations which will assist in attenuating sound in a room area where the object 160 is placed.

Figure 17:
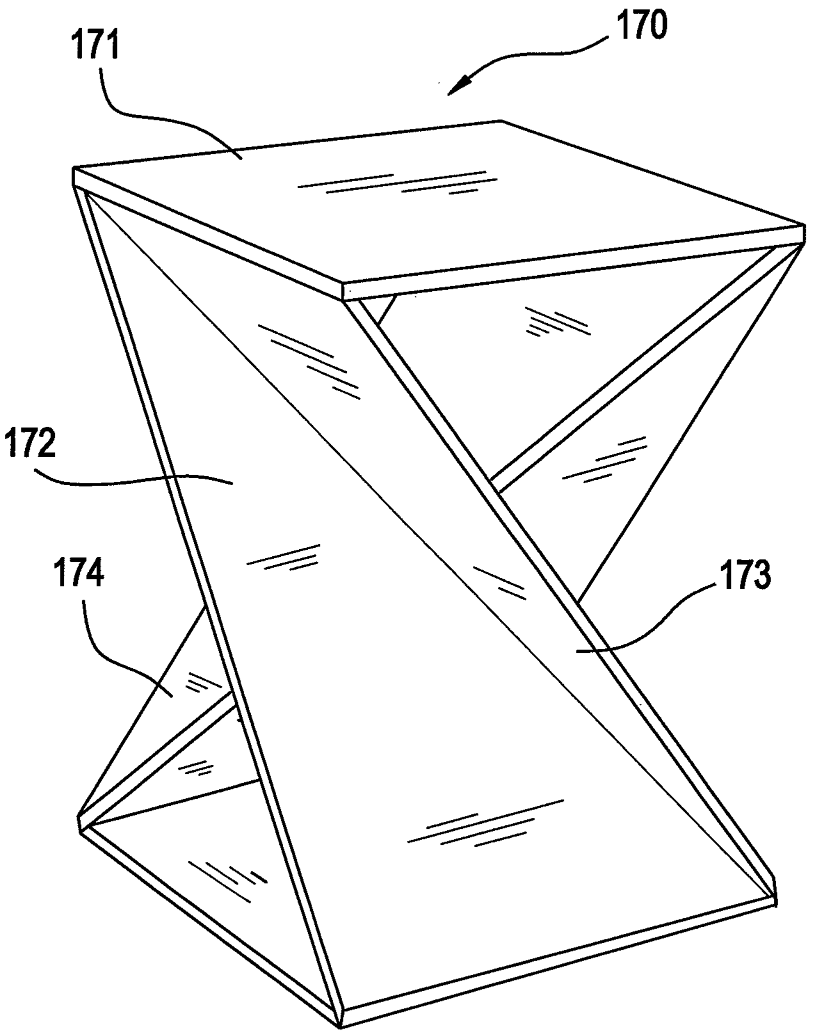
FIG. 17 shows a free-standing object having angled surfaces that may be improved with micro-perforations.

FIG. 17 shows a further example of a free-standing object 170 having a flat top surface 171 that can be used as a seat or to support any desired object. The object 170 includes angled support walls 172, 173, 174 and others as shown. While these side walls are angled, they can still be provided with micro-perforations that can be helpful in attenuating sound within a room where the object is located.

Figure 18:
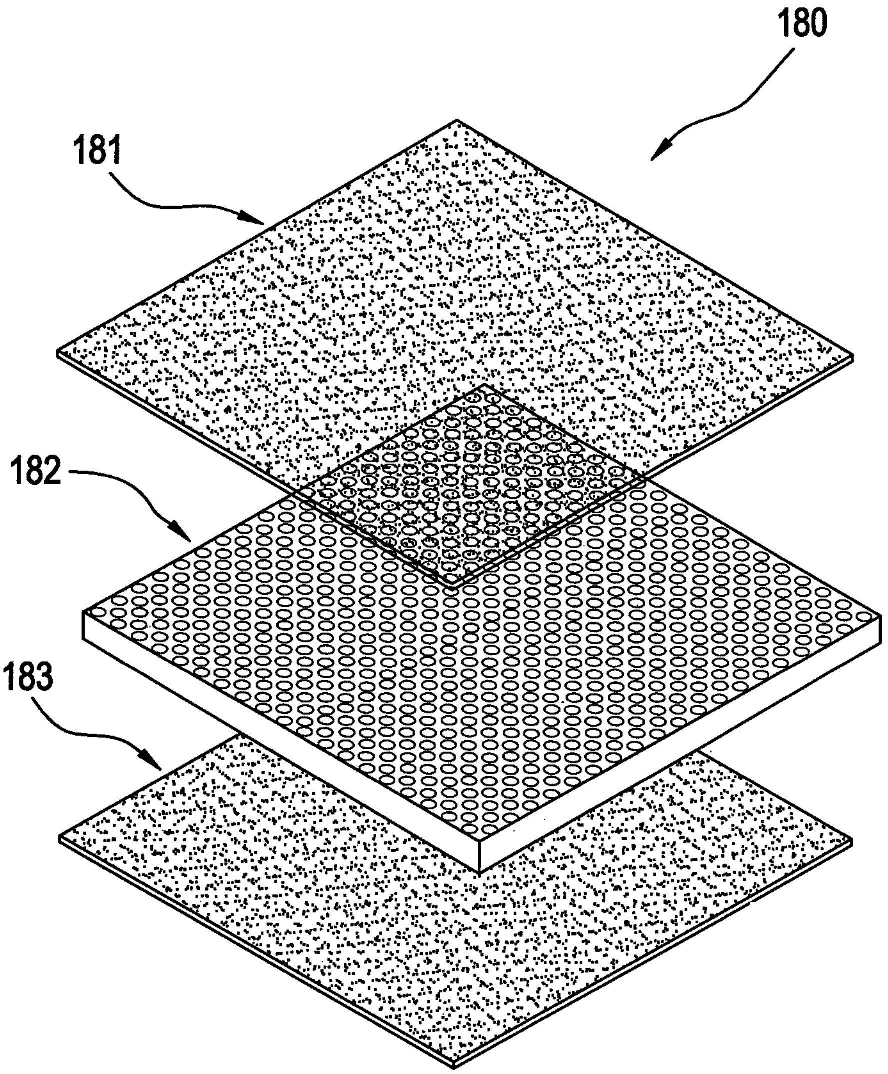
FIG. 18 shows an exploded perspective view of a panel made up of a central core with openings therethrough surrounded by micro-perforated panels.

FIG. 18 shows structures generally designated by the reference numeral 180 that are similar to those shown in FIG. 4. They include a front veneer 181 having a multiplicity of micro-perforations therethrough, a central core 182 with holes therethrough larger than 1 mm in diameter and a rear veneer 183 covered with a pattern of micro-perforations. The central core can be of any desired thickness, for example, ¼" to 1¼". The central core can be made porous to sound by any desired means, such as, for example, holes larger than 1 mm in diameter, fibrous structures, honeycombing, structurally porous, etc. Cores may be made from MDF (medium density fiberboard).

Figure 19:
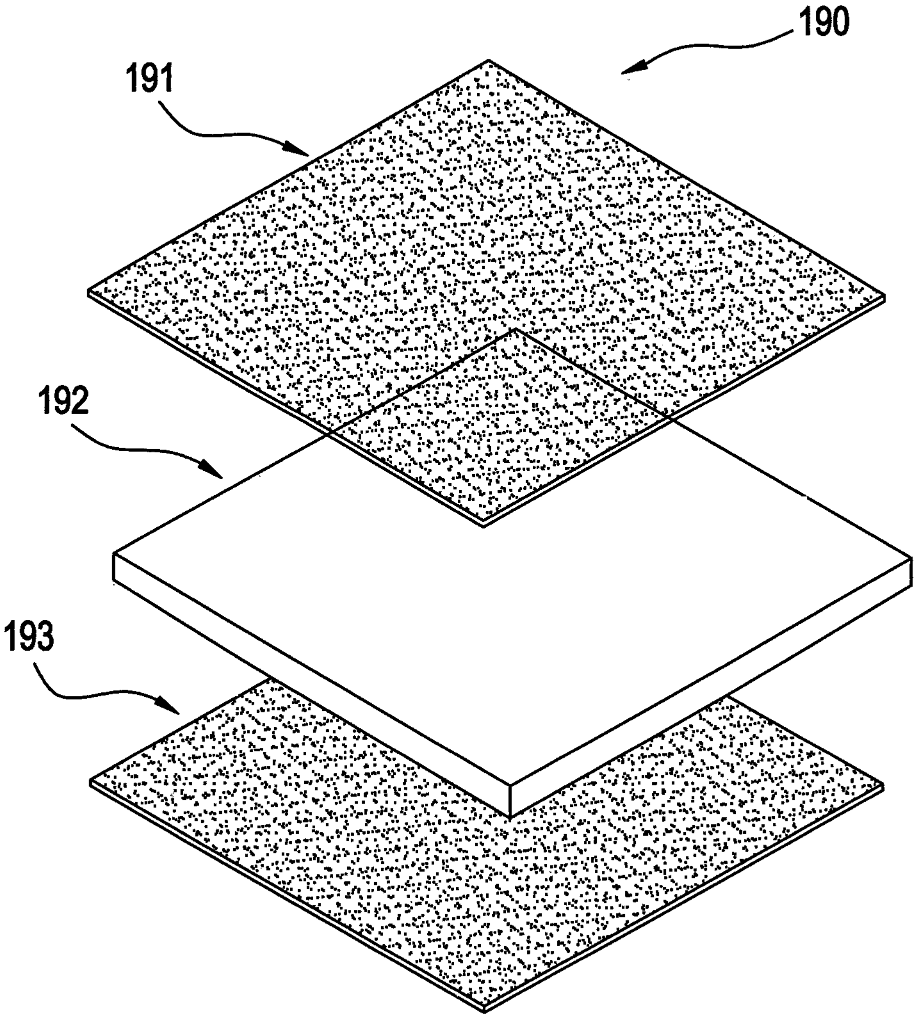
FIG. 19 shows a further example, an exploded perspective view of a panel made up of a central porous core surrounded by micro-perforated panels.

FIG. 19 shows an exploded view of a panel 190 made up of a central core 192 which is porous though not through the provision of holes formed therethrough and is surrounded by veneers 191 and 193 which correspond to the veneers 181 and 183 shown in FIG. 18.

Figure 20:
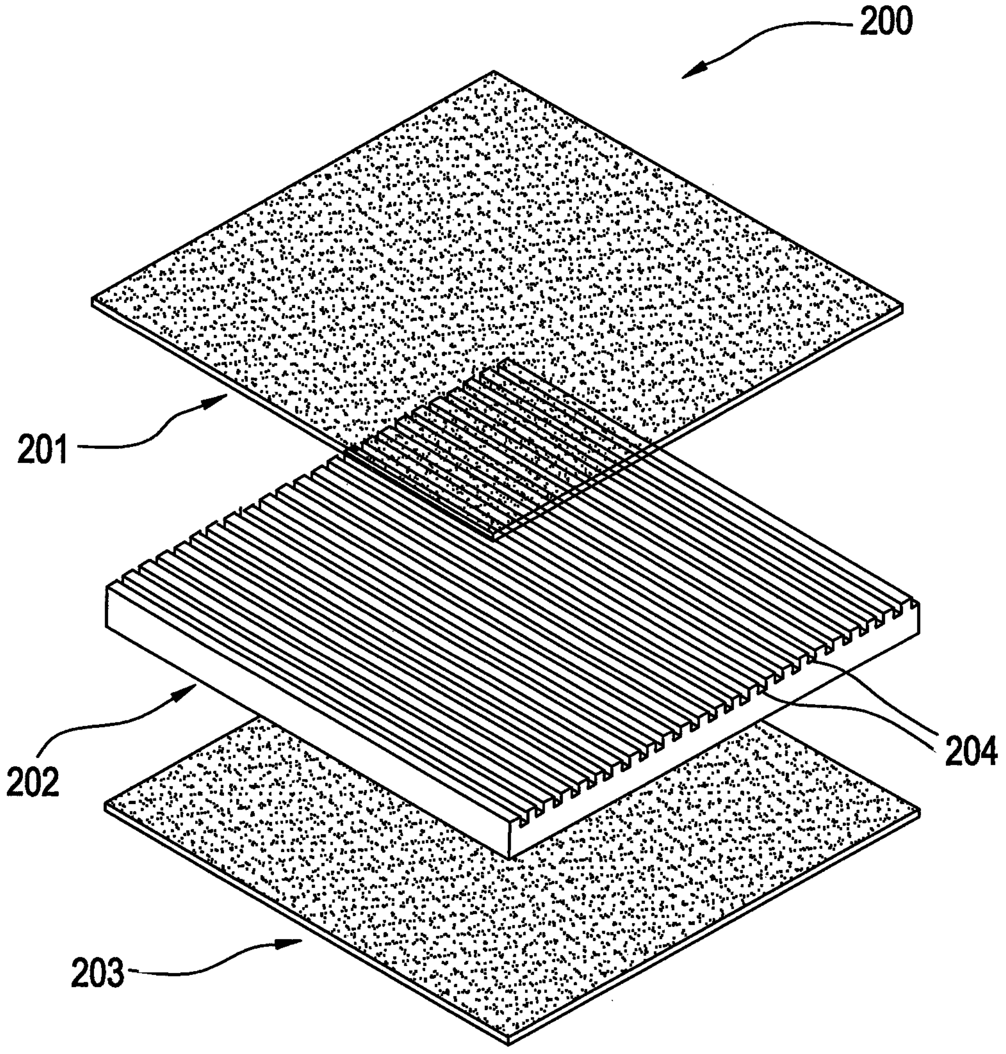
FIG. 20 shows a yet further example, an exploded perspective view in which the core has a series of parallel slots.

FIG. 20 shows another example 200 with a core 202 surrounded by veneers 201 and 203 corresponding to the veneers 181 and 183 of FIG. 18. The core 202 includes a plurality of parallel grooves 204 which have been found to be helpful in attenuating sound.

Figure 21:
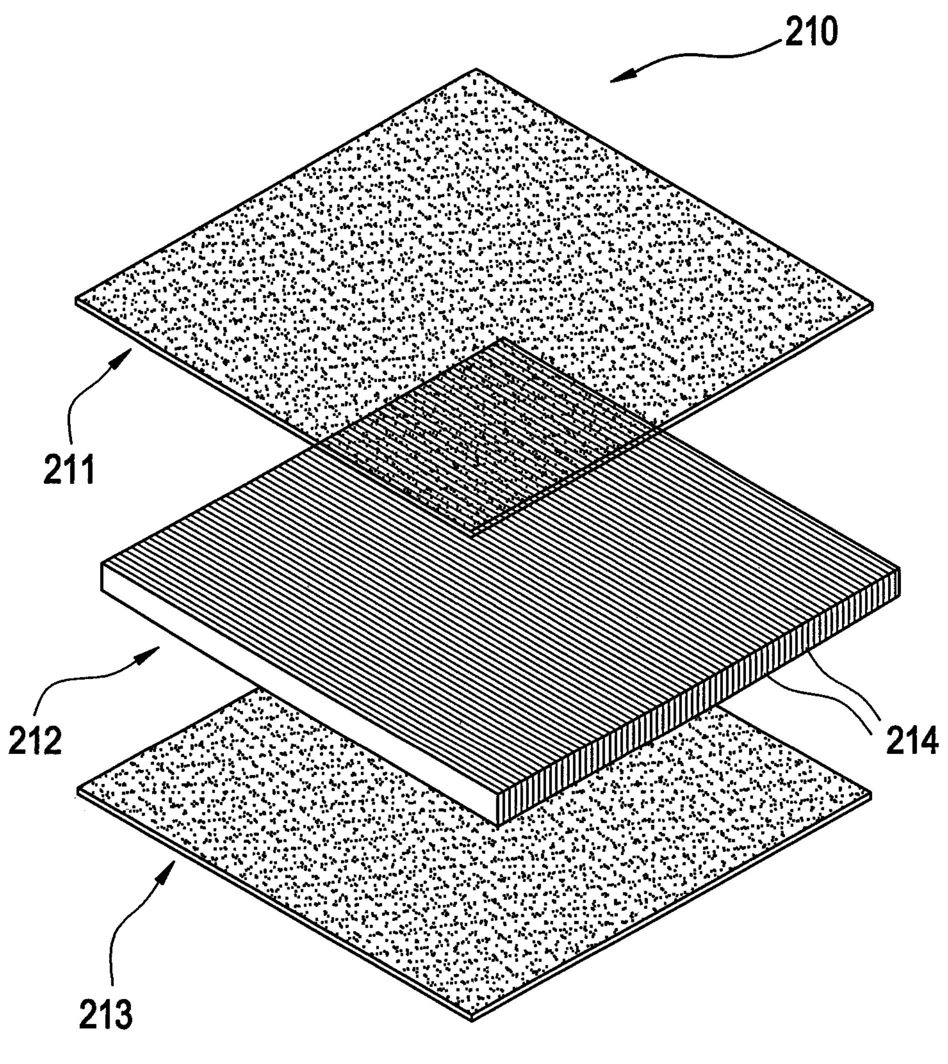
FIG. 21 shows a further example, an exploded perspective view in which the core has slots extending completely therethrough.

FIG. 21 shows a further example 210 which has veneers 211 and 213 corresponding the veneers 181 and 183 of FIG. 18. The central core 212 has the provision of multiple slots 214 extending completely therethrough to facilitate transmission of any sound traveling through the veneer 211 to the veneer 213.

In the preferred embodiments of the present invention, micro-perforated structures are typically only employed on vertical surfaces. Horizontal surfaces are not as impinged by soundwaves and adding micro-perforations to those surfaces does not result in appreciable increase in sound attenuation. Where a horizontal surface is a desk top, micro-perforations might be problematic, since, for example, spilled liquids could enter the micro-perforations and leak into the area below. However, surfaces that are angled, having a vertical component, could, if desired, be provided with micro-perforated surfaces. However, non-functional horizontal surfaces, such as the cabinet tops, can be micro-perforated for additional sound absorption.

Materials from which the micro-perforated structures can be created comprise any materials that can be micro-perforated using a laser cutting tool or a punch press or drill. The micro-perforations are typically formed using a laser cutting tool that can be configured to create micro-perforations that are either cylindrical or frustoconical (see FIG. 6). Where frustoconical micro-perforations are formed, the smaller diameter is to the rear of the face and the larger diameter is at the front of the face. Alternatively, micro-perforations can be formed using a drill, a drill press, a punch press or any other device that can create small diameter holes within the range of 0.20 to 0.70 mm in a solid piece of material. Applicants note that use of a laser cutting tool enables creation of frustoconical micro-perforations. This is not possible when using a drill, a drill press or a punch press. Micro-perforated structures can be made of wood, synthetic wood, particle board, and metals such as aluminum, again, so long as the micro-perforations can be formed using a laser cutting tool.

In one preferred configuration, a panel can consist of a front facing wood veneer, a central MDF core having holes therethrough, and a rear facing wood veneer. An example of this configuration is shown in FIG. 4 with reference to reference numerals 15, 17 and 19. The holes in the core can exist due to the structure of the core being a honeycomb configuration, fibrous, structurally porous or a rigid piece through which large holes greater than 1 mm in diameter are formed.

As such, an invention has been disclosed in terms of preferred embodiments thereof which fulfill each and every one of the objects of the invention set forth hereinabove and provide new and useful furniture with acoustical treatments of great novelty and utility.

Various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A freestanding article of furniture comprising:

a) a plurality of structures having surfaces chosen from the group consisting of vertical, horizontal, angled and having horizontal and vertical components;

b) at least one of said structures consisting of at least one panel having (i) a said surface and comprising a first veneer with a pattern of micro-perforations extending completely therethrough, (ii) a sound porous core abutted behind said first veneer, and (iii) a second veneer abutted behind said sound porous core and having a pattern of micro-perforations extending therethrough, said micro-perforations of said first veneer acoustically connected to porous aspects of said sound porous core and to said micro-perforations of said second veneer, porous aspects of said sound porous core solely consists of a pattern of a plurality of holes larger in diameter than said micro-perforations, said holes extending from a flat front surface of said core through to a rear surface of said core, said holes being isolated from one another;

c) said micro-perforations having an average diameter within a range of from 0.25 to less than 0.65 mm;

d) at least one second veneer facing a storage space defined between said plurality of structures, said free-standing article of furniture configured to be located within a room whereby sounds within said room defined by soundwaves impinging upon said at least one panel are attenuated when they enter said micro-perforations of said first veneer; and e) said at least one panel exhibiting enhanced sound absorption measured by increased Sabin values and reduced sound reverberation time as compared to a conventional furniture panel.

2. The article of furniture of claim 1, wherein said micro-perforations are generally cylindrical.

3. The article of furniture of claim 1, wherein said micro-perforations are generally frustoconical.

4. The article of furniture of claim 3, wherein said micro-perforations have a larger diameter at a front surface of a structure having said micro-perforations.

5. The article of furniture of claim 1, wherein said micro-perforations extend into said structures having vertical surfaces.

6. The article of furniture of claim 1, comprising a desk.

7. The article of furniture of claim 6, wherein said desk has a horizontal structure having a horizontal flat surface.

8. The article of furniture of claim 6, wherein said desk includes at least one storage drawer having a front vertical closure structure having a flat front surface, said front vertical closure structure having a plurality of micro-perforations extending therethrough.

9. The article of furniture of claim 6, wherein said desk includes a storage compartment with a front opening closed by a vertical door having a flat front surface, said door having a plurality of micro-perforations extending therethrough.

10. The article of furniture of claim 7, wherein said horizontal structure is supported by a wide vertical leg with micro-perforations extending therethrough.

11. The article of furniture of claim 9, wherein said vertical door is pivotable about vertically disposed hinges.

12. The article of furniture of claim 9, wherein said storage compartment comprises a plurality of storage compartments, each closed by a door having a vertical surface, each door having a plurality of micro-perforations extending therethrough.

13. The article of furniture of claim 1, wherein said micro-perforations increase sound absorption of said article of furniture by up to 4 Sabins within a range of sound frequencies of 100 Hz to 5,000 Hz.

14. The article of furniture of claim 12, wherein said micro-perforations are generally cylindrical.

15. The article of furniture of claim 12, wherein said micro-perforations are generally frustoconical.

16. The article of furniture of claim 15, wherein said micro-perforations have a larger diameter at a front surface of a structure having said micro-perforations.

17. The combination of claim 1, chosen from the group consisting of a storage device, a desk, and a free-standing object.

18. The combination of claim 17, wherein said storage device has a plurality of cubicles defined by walls forming a rectangle.

19. The combination of claim 17, wherein said free-standing object is rectangular cubic with vertical walls having micro-perforations.

20. The combination of claim 17, wherein said free-standing object includes angled support walls with micro-perforations.

21. A sound absorbing freestanding desk comprising:

a) a plurality of structures having vertical and horizontal surfaces, said horizontal surfaces including a writing surface;

b) at least one of said structures consisting of at least one panel having (i) a said vertical surface and comprising a front veneer with a pattern of micro-perforations extending completely through vertical surfaces thereof, (ii) a sound porous core abutted behind said front veneer, and (iii) a rear veneer abutted behind said sound porous core and having a pattern of micro-perforations extending therethrough, said micro-perforations of said front veneer acoustically connected to porous aspects of said sound porous core and to said micro-perforations of said rear veneer, porous aspects of said sound porous core solely consists of a pattern of a plurality of holes larger in diameter than said micro-perforations, said holes extending from a flat front surface of said core through to a rear surface of said holes being isolated from one another c) said structures with vertical surfaces chosen from the group consisting of one or more of a door, a drawer front, and a support leg;

d) said micro-perforations having an average diameter within a range of from 0.25 to less than 0.65 mm;

d) at least one second veneer facing a storage space defined between said plurality of structures, said free-standing desk configured to be located within a room whereby sounds within said room defined by soundwaves impinging upon said at least one panel are attenuated when they enter said micro-perforations of said front veneer; and f) said at least one panel exhibiting enhanced sound absorption measured by increased Sabin values and reduced sound reverberation time as compared to a conventional desk panel.

22. The desk of claim 21, wherein said micro-perforations are chosen from the group consisting of generally cylindrical and frustoconical.

23. The desk of claim 21, wherein said desk includes at least one storage drawer having a front vertical closure structure having a flat front surface, said front vertical closure structure having a plurality of micro-perforations extending therethrough.

24. The desk of claim 21, wherein said micro-perforations increase sound absorption of said desk by up to 4 Sabins within a range of sound frequencies of 100 Hz to 5,000 Hz.

25. The combination of claim 21, wherein said plurality of holes in said core have diameters greater than 1 mm.

* * * * *